United States Patent [19]

Cox

[11] 4,336,876
[45] Jun. 29, 1982

[54] MECHANICAL HANDLING APPARATUS FOR RECLAIMING MATERIAL FROM A STOCKPILE

[75] Inventor: Eric R. Cox, Twyning, England

[73] Assignee: Babcock-Moxey Limited, Gloucester, England

[21] Appl. No.: 190,317

[22] PCT Filed: Jul. 31, 1979

[86] PCT No.: PCT/GB79/00127
§ 371 Date: Apr. 8, 1980
§ 102(e) Date: Apr. 3, 1980

[87] PCT Pub. No.: WO80/00333
PCT Pub. Date: Mar. 6, 1980

[30] Foreign Application Priority Data

Aug. 8, 1978 [GB] United Kingdom ............... 32608/78

[51] Int. Cl.³ .............................................. B65G 57/00
[52] U.S. Cl. ....................................... 198/509; 37/97; 198/518; 198/714; 414/133
[58] Field of Search ............... 198/509, 518, 703, 713, 198/714; 414/133, 145; 37/94, 95, 97

[56] References Cited

U.S. PATENT DOCUMENTS 2,528,012 10/1950 Mensforth .......................... 198/509
3,069,027 12/1962 Dischinger ..................... 198/509 X

FOREIGN PATENT DOCUMENTS 1116429 6/1968 United Kingdom ................ 414/133

Primary Examiner—Robert B. Reeves
Assistant Examiner—Douglas D. Watts
Attorney, Agent, or Firm—Kemon & Estabrook

[57] ABSTRACT

A stockpile drum reclaiming machine is operable in either direction has a twelve faced drum carried on a gantry provided with wheeled bogies running on rails over the length of the stockpile. The faces are arranged in pairs each pair with an interior angle of 165° and a T-section member positioned externally along the arris to form opposed blind pockets during reclaiming, the drum may be rotated and moved in either direction and alternative transfer conveyors carried on an arcuate beam rotatable through a restricted arc are positionable to receive reclaimed material thrown clear of the drum after having been carried over in the appropriate pockets. Oscillatable luffable harrows are provided to each side of the drum and are positionable to engage the stockpile being reclaimed.

6 Claims, 3 Drawing Figures

MECHANICAL HANDLING APPARATUS FOR RECLAIMING MATERIAL FROM A STOCKPILE

This invention relates to mechanical handling apparatus adapted to reclaim material from a stockpile of material such as iron ore or coal.

Previous mechanical handling apparatus adapted to reclaim material from a stockpile have included a rotatable cylindrical drum some six meters or more in diameter provided with external bucket scoops and mounted on a support structure or gantry running on rails each side of the stockpile. With advancement of the gantry and rotation of the drum the bucket scoops are moved through the material to load the material into the bucket scoops and, with continued rotation, discharge the material either through apertures in the drum to a conveyor extending through the interior of the drum or, as in GB Patent Specification No. 1,326,340, over an outside surface of the bucket scoop next adjacent in the direction of rotation onto a conveyor extending alongside and parallel to the axis of the drum.

The bucket scoops by their form, can only operate in one direction of rotation. This has the result that the reclaimer can operate only in one direction of movement of the gantry and thus requires that a clear plot of land of size equivalent to the size of the stockpile be provided adjacent the stockpile to permit return of the gantry to the initial end of the stockpile, or to an adjacent stockpile, after transfer to a set of rails running over the clear plot.

Furthermore, bucket scoops require the positioning of relatively complex structures on the cylindrical drum, which structures are liable to wear from abrasion arising both from movement into the stockpile and from discharge of material with a sliding motion either through the apertures in the drum or over the outside surface of the bucket scoop next adjacent in the direction of rotation onto a conveyor extending alongside and parallel to the axis of the drum.

It is an object of the invention to provide a mechanical handling apparatus adapted to reclaim material from a stockpile of a simplified construction capable of operation in both directions and having a scoop arrangement less liable to suffer abrasion than the previous arrangement.

According to the present invention there is provided mechanical handling apparatus adapted to reclaim material from a stockpile including a rotatable cylindrical drum mounted on a support structure or gantry running on rails each side of the stockpile in which the support structure or gantry is traversable in either direction over the length of the stockpile and carries first and second transfer conveyors respectively extending at each side of the drum parallel to the axis thereof and the drum rotatable in either direction and is provided with blind scoops or pockets open in opposed directions, such that the blind scoops or pockets open in one direction serve with clockwise rotation of the drum to scoop material from a first portion of the stockpile to one side of the drum and, upon further clockwise rotation of the drum, discharge the material therefrom to the first transfer conveyor at the side of the drum remote from the first portion of the stockpile and the blind scoops or pockets open in the other direction serving with anti-clockwise rotation of the drum to scoop material from a second portion of the stockpile to the side of the drum remote from the second portion and, upon further anti-clockwise rotation of the drum, discharge the material therefrom to the second transfer conveyor.

The invention will now be described, by way of example, with reference to the accompanying drawings, in which.

Figure 1:
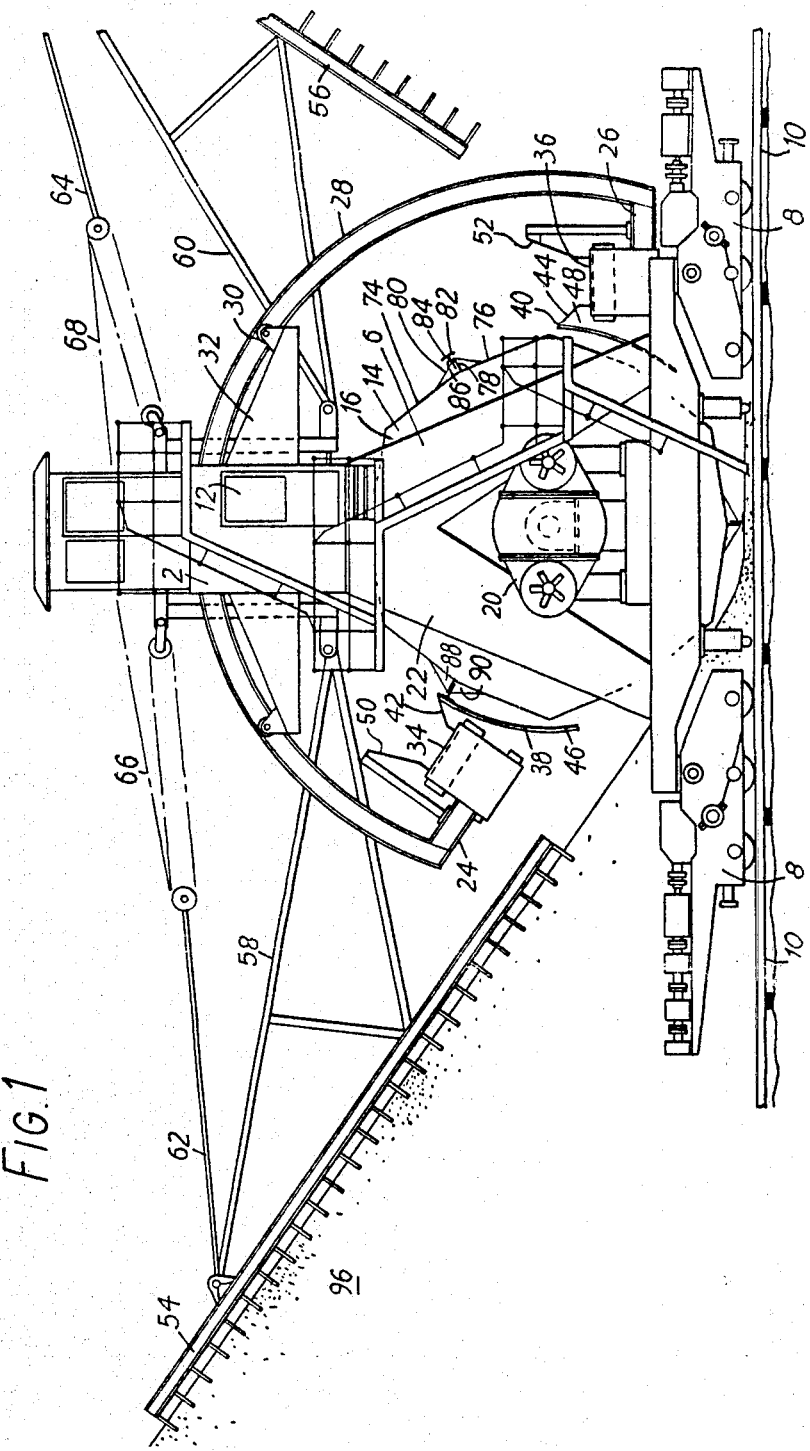
FIG. 1 is a side elevation of a blending, drum reclaimer machine.
Figure 2:
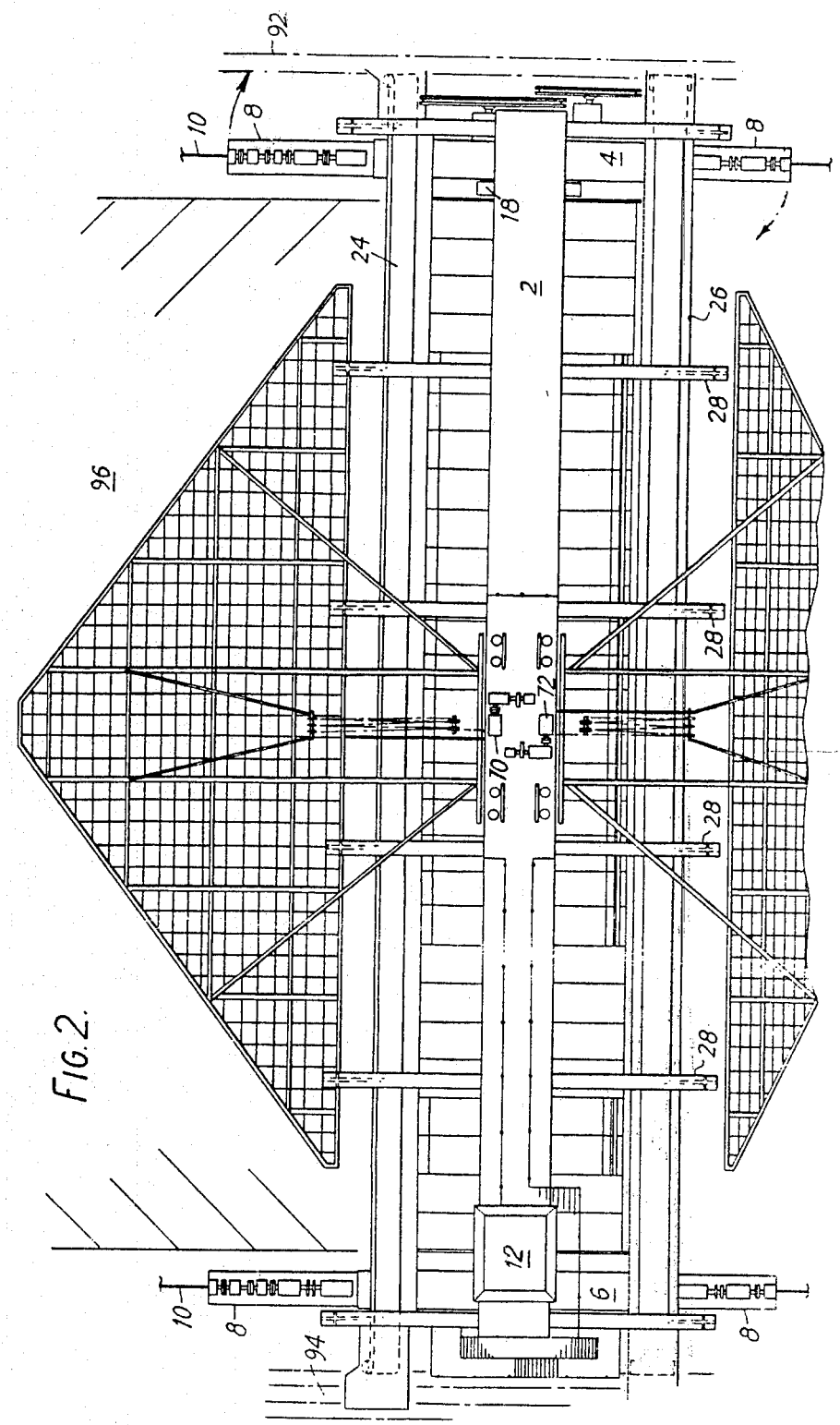
FIG. 2 is a plan view of the machine.
Figure 3:
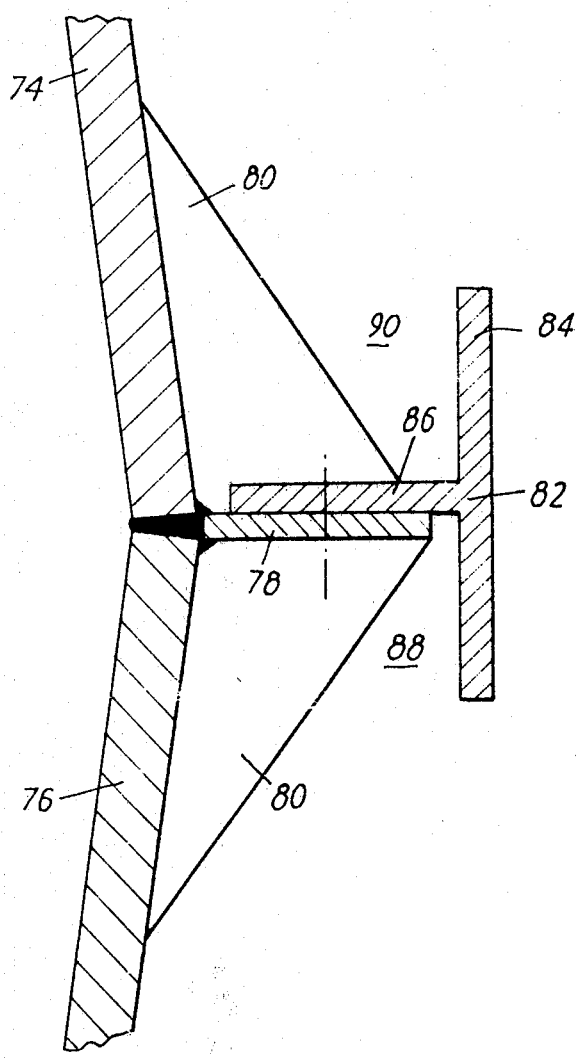
FIG. 3 is a portion of FIG. 1, to an enlarged scale.

Referring to the drawings, the support structure or gantry includes a bridge box girder 2 supported on a pair of end frames 4, 6 mounted on four powered, articulated bogies 8 running on rails 10 extending the length of a stock yard. The bridge box girder 2 is rigidly secured to one end frame 4 and pivotably mounted on the other end frame 6 to accommodate minor discrepancies encountered during motion of the reclaimer along the rails 10. A control cabin 12 is mounted on the bridge box girder 2 and is equipped to permit drive of the drum reclaimer machine in either direction. The drum 14 is formed with closed end walls 16 carrying shafts supported in spherical roller bearings in housings 18, 20 respectively mounted at one end on the end frame 4 rigidly connected to the bridge box girder and at the other end on a framework 22 suspended from the bridge box girder.

A pair of platforms 24, 26 are carried on the ends of a framework formed by arcuate I-beams 28. The arcuate beams extend over slightly in excess of 180° of arc and are supported on rollers 30 mounted on arms 32 on the supporting structure such that the arcuate beams 28 are rotatable through a limited arc about the drum axis. Rack gearing (not shown) is mounted on the arcuate beams and meshes with pinions rotation of which effects rotation of the arcuate beams between, for each end of the beam, an operational position and a raised position. The platforms 24, 26, which extend over the width of the supporting structure are positioned at the two ends of the arcuate beams such that when the respective end of the arcuate beam is in the operational position the associated platform extends horizontally. Each platform 24, 26 carries a transfer conveyor 34, 36 extending parallel to the drum axis and a shield 38, 40 having a deflector portion 42, 44 arranged to direct material toward the conveyor and a curved portion 46, 48 directing material back to the foot of the stockpile. Further shields 50, 52 are provided to the sides of the conveyors remote from the drum.

Harrows 54, 56 are provided on each side of the drum, and are connected to the bridge box girder with struts 58, 60 pivoted on the bridge box girder and are supported at their outer ends by ties 62, 64 connected through pulley blocks and cables 66, 68 running upwardly to winches 70, 72 on the bridge box girder for luffing the harrows. Articulated drives (not shown) are provided to the two harrows to effect lateral oscillation thereof to rake material from the face of the stockpile to the base thereof.

The drum is formed with six pairs of flat faces 74, 76, the included angle between the pairs of faces being approximately 165° and the included angle between adjacent faces of adjacent pairs being approximately 130°. Strips 78 are welded to the external arrises between the faces of the pairs of faces and are braced at spaced intervals with webs 80 extending in radial planes perpendicular to the strips. T-Section bars 82 are located with flange portions 84 extending tangentially and are bolted through rib portions 86 thereof to the strips 78 welded to the arrises to form pairs of opposed blind scoops or pockets 88, 90 on the surface of the drum. Since the T-Section bars 82 are bolted to the strips 78 replacement upon wear is thereby facilitated and does not involve the fabrication of complex structures. Alternatively, the whole structure of the scoops and even adjacent portions of the drum may be made replaceable, although this might complicate replacement.

Reclaiming conveyors 92, 94 (shown in outline) are positioned to either side of the reclaimer machine and extend parallel to the rails 10 over the length of the stockyard.

In operation, to reclaim material, such as iron ore or coal, from a stockpile 96, the drum reclaimer machine is advanced slowly into the stockpile, by driving the bogies 8, with the harrow 54 at the leading side of the drum reclaimer lowered to engage the face of the stockpile and the conveyor 34 at the leading side positioned at the raised position clear of the harrow and the stockpile. The leading harrow is oscillated to deliver material to the foot of the stockpile and the drum rotated to move the pockets 88 upwardly through the base portion of the stockpile. Material is carried upwardly in the advancing pockets 88 of the pairs of opposed pockets and over the top of the drum to discharge downwardly clear of the preceding pockets 88 and 90 and onto the conveyor 36 at the trailing side of the drum. Any material not falling on to the conveyor is directed by the curved plate 48 back to the foot of the stockpile. The conveyor is driven to discharge in turn to either the reclaiming conveyor 92 or the reclaiming conveyor 94.

Upon reaching the end of the stockpile, instead of moving the drum reclaimer laterally to another, parallel, set of rails at an adjacent stockpile, the drum reclaimer machine may work in the opposite direction on the rails it is already on to reclaim from a stockpile deposited or stocked in the wake of the first run of the reclaimer by a separate stocking conveyor. To advance the drum reclaimer in the opposite direction, the cable winch 70 of the harrow 54 that was in the operating position is actuated to raise that harrow, the rack and pinion gear are actuated to rotate the arcuate beams 28 and move the platforms such that the platform 24 that was in the raised position is lowered to the operational position and the other platform 26 is rotated to the raised position and the cable winch 72 of the harrow which was in the raised position is actuated to lower that harrow. The bogies 8 and the drum 14 are then driven in the opposite direction to the direction in the first run and the reclaimer operates as previously with the pockets 90 of the pairs of pockets not previously utilised carrying the material upwardly and over the top of the drum to the conveyor 34.

The stockyard may be relatively long and narrow with a single set of rails 10 extending the length of the yard, a boom stacking machine running on rails to one side of the yard, or, alternatively the yard may be of sufficient width to accommodate two parallel sets of rails 10 with a boom stacking machine running on rails between adjacent rails of the two sets. In the latter case, a transfer track extending perpendicular to the rails 10 is provided at the middle or ends of the stockyard, or both, and jacking means are provided on the machine such that on urging the jacks downwardly, the bogies may be swung through 90° to engage the transfer track the machine being lowered to permit lateral transfer of the machine from one set of rails to the other set and then raised and lowered again to position the bogies on the other set of rails. The harrows 54, 56 and the platforms 24, 26 are then positioned appropriate to the direction of reclaiming movement required and the drives to the bogies and drum energised as necessary.

I claim:

1. A mechanical handling apparatus for reclaiming material from a stockpile including a wheeled frame moveable on rails extending to each side of the stockpile; a support structure mounted on said wheeled frame; drive means for traversing the wheeled frame in either direction along the rails; a rotatable cylindrical drum mounted on the support structure and provided with a plurality of blind scoops each open in opposed directions for scooping material from the stockpile; first and second transfer conveyors mounted on the support structure and extending to each external side of the drum in a direction parallel to the axis of rotation thereof, for receiving material discharged from the blind scoops; means for angularly displacing of the first and second conveyors to move the conveyors independently between an operative position and raised position such that when one conveyor is in the operative position to receive material from the blind scoops the other conveyor is in the raised position clear of the stockpile; and means for rotating the durm such that the blind scoops open in one direction serving with clockwise rotation of the drum to scoop material from a first portion of the stockpile to one side of the drum; and upon further clockwise rotation of the drum discharge the material therefrom to the first transfer conveyor at the side of the drum remote from the first portion of the stockpile and blind scoops open in the opposed direction serving with anti-clockwise rotation of the drum to scoop material from a second portion of the stockpile to the side of the drum remote from the second portion and, upon further anti-clockwise rotation of the drum, discharge the material therefrom to the second transfer conveyor.

2. A mechanical handling apparatus as claimed in claim 1 wherein the means for altering the angular displacement of the first and second conveyors includes arcuate beams carried on rollers.

3. A mechanical handling apparatus as claimed in claim 1 wherein the drum includes a plurality of flat faces connected together in pairs with the included angle between the faces of a pair being greater than the included angle between adjacent faces of adjacent pairs of faces; and a plurality of opposed blind scoops formed by strips connected to the arrises between the faces of the pairs of faces which extend radially outwardly and which are braced with webs at spaced intervals having tangentially extending strips.

4. A mechanical handling apparatus as claimed in claim 3 wherein the tangentially extending strips are each formed by a flange portion of a T section bar, a corresponding web portion thereof being connected to the strips welded to the arises.

5. A mechanical handling apparatus as claimed in claim 4 wherein the web portions of the T section bars are connected by bolts to the strips welded to the arises.

6. A mechanical handling apparatus as claimed in claim 1 wherein first and second harrow means for agitating the surface of the stockpile are mounted on the support structure, either side of the drum, said harrows being respectively supported from pivotable connections on the support structure by struts pivoted on the support structure and connected through cables and pulley blocks to winches actuable to luff the harrows.

* * * * *